United States Patent

[11] 3,580,484

| [72] | Inventor | Michael S. Schneider, Los Angeles, Calif. (5755 Cantelope Ave., Van Nuys, Calif. 91401) |
|---|---|---|
| [21] | Appl. No. | 809,573 |
| [22] | Filed | Mar. 24, 1969 |
| [45] | Patented | May 25, 1971 |

[54] PORTION ACCESS PIE PLATE
4 Claims, 8 Drawing Figs.

[52] U.S. Cl. .................................................. 229/51,
206/4, 206/45.32, 229/2.5, 229/3.5, 249/61
[51] Int. Cl. .................................................. B65d 1/34,
B65d 17/02, A47j 37/01
[50] Field of Search ........................................ 229/2.5,
3.5, 51 Div.; 206/4, 45.32; 249/61

[56] References Cited
UNITED STATES PATENTS

| 3,327,921 | 6/1967 | Baughan | 229/31 |
| 3,233,813 | 2/1966 | Wolford et al. | 229/3.5(MF) |
| 2,403,901 | 7/1946 | Belanger | 229/51(DIV)X |
| 2,309,557 | 1/1943 | Watkins | 206/45.32 |
| 2,242,684 | 5/1941 | Stuart | 229/31X |

*Primary Examiner*—Leonard Summer
*Attorney*—William H. Maxwell

ABSTRACT: This invention relates to edible pies that are baked in plates and then cut into segmental portions and removed from the plate as individual servings, provision being made for gaining access to and to loosen each portion of pie in order to avoid mutilation thereto, and involving lines of weakening extending radially of the plate so as to define segments and specifically through the side and rim of the plate, whereby segmental sections of the side and rim are hinged and depressable for exposing cut portions of pie and for having a lever action that lifts and loosens the pie, thereby facilitating extraction of pie portions from the plate without mutilation.

PATENTED MAY 25 1971  3,580,484
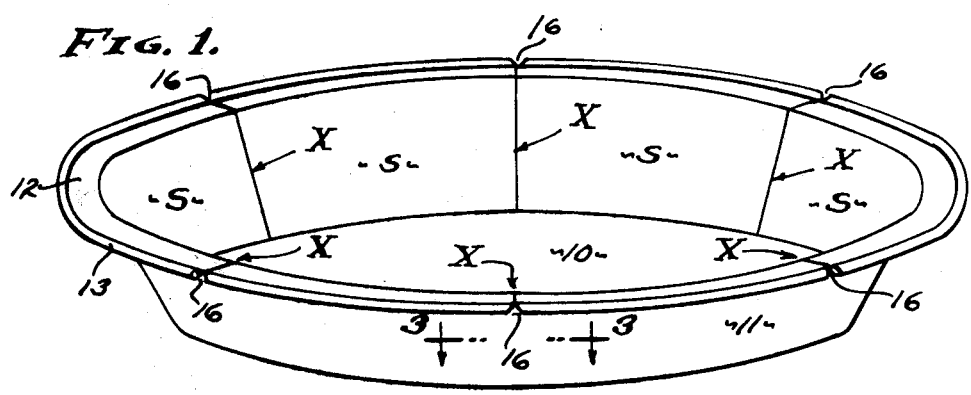
FIG. 1.
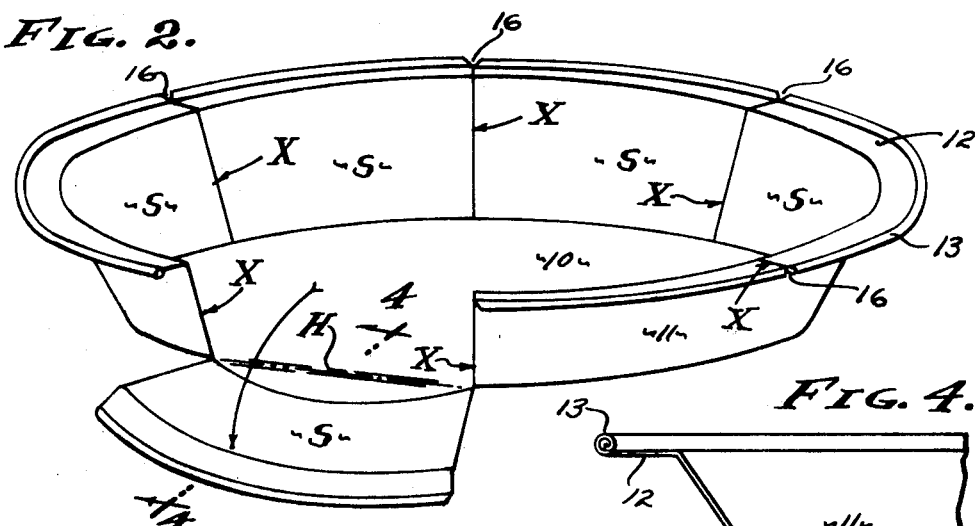
FIG. 2.
FIG. 4.
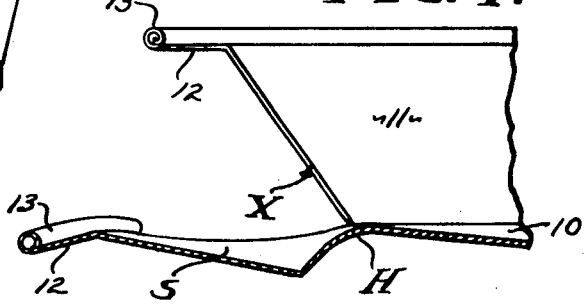
FIG. 3.
FIG. 5.
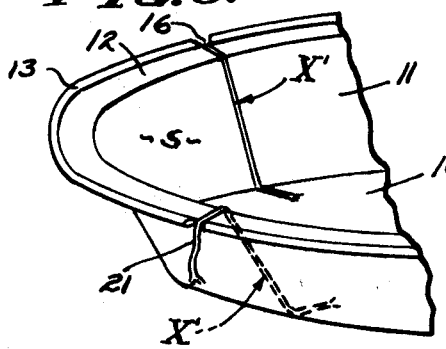
FIG. 7.
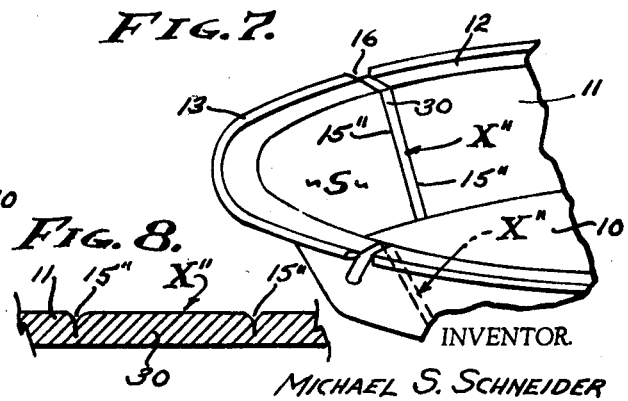
FIG. 8.
FIG. 6.
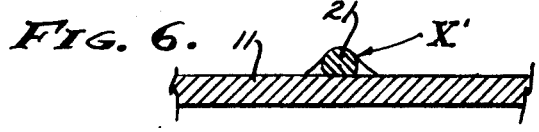
INVENTOR.
MICHAEL S. SCHNEIDER
BY

PORTION ACCESS PIE PLATE

Edible pies are backed in plates having integrally formed bottoms and sides that confine the pie while baking and during their transportation and storage, many such pies being of a soft nature requiring structural support. As a consequence, when portions of pie are cut from the whole of a pie, the knife and/or spatula must be manipulated between the pie and supporting plate. Needless to say, pies tend to stick to the plate in which they are baked and involve curved and angularly related surfaces, and they vary in consistency and are characterized by a surrounding crust, and the crust too varies in consistency. Thus, when extracting pieces of pie from a typical pie plate having an upstanding side, difficulty is invariably experienced to some degree at least and especially with removal of the first piece of pie. Therefore, it can be expected that all portions of pies will be mutilated to some extent, and for example a discriminating person will always be tempted to choose what obviously appears to him to be the best piece of pie. Another outcome of the inevitable prior art mutilation of pie portions is the apology often expressed by the person serving a piece of pie to another, indicating for example that "this was the best that could be done" and "would you like a different piece" etc. It is apparent therefore that difficulties do arise in the extraction of pie portions from a pie plate, mutilation of said portions being expected and not the exception.

An object of this invention is to provide a new and improved pie plate with a facility that exposes cut pie portions for easy extraction and without mutilation, when exercising ordinary care. With the present invention, a side section of the pie plate separates from the remaining body thereof and is adapted to be depressed, thereby exposing a corresponding segmental portion of the pie. It is a simple matter to cut and remove the said exposed portion and all without the usual digging action which is most often necessary when using prior art pie plates.

It is an object of this invention to provide a new and improved pie plate with a facility that loosens cut pie portions for easy removal and thereby avoiding mutilation thereof. With the present invention, the depressable side section hereinabove referred to is hinged to the remaining parts of the plate and affords a lever that lifts the plate bottom at and overlying the pie portion being exposed for extraction, whereby said bottom is deflected upwardly in such a manner that it induces a separation of the bottom and the pie portion at the peripheral area of pie plate bottom.

Another object of this invention is to provide a new and improved pie plate having the functions above referred to and wherein positioned lines of weakening determine the segmental size of the access, and preferably determine the segmental size of the pie portions as well, said lines of weakening being confined to the sides of the pie plate. In the event that the pie plate has a rim, then the weakening is inclusive of said rim and any other peripheral structures such as a bead or rolled edge.

It is still another object of this invention to provide a pie plate of the character hereinabove referred to and which is expendable, the instant pie plate being made of thin inexpensive and easily destructible metal such as aluminum which is readily formed and which is readily weakened and which can be easily torn at said weakening and later destroyed, while maintaining structural integrity until deliberately manipulated into portion access condition and/or more extensive deformations.

The various objects and features of this invention will be fully understood from the following detailed description of the typical preferred forms and applications thereof, throughout which description and reference is made to the accompanying drawings, in which:

FIG. 1 is a perspective view showing a typical pie plate embodying the features of the present invention showing the initial formation thereof.

FIG. 2 is a view similar to FIG. 1 showing the same pie plate following depression of a segmental portion thereof, all as provided for by the present invention.

FIGS. 3 and 4 are enlarged sectional views taken as indicated by lines 3-3 and 4-4 on FIGS. 1 and 2 respectively FIGS. 5 and 6 are fragmentary views showing a second embodiment of the present invention, FIG. 5 corresponding to a portion of FIG. 1 and FIG. 6. corresponding to FIG. 3;

FIGS. 7 and 8 are fragmentary views showing a third embodiment of the present invention, FIG. 7 a corresponding to a portion of FIG. 1 and FIG. 8 corresponding to FIG. 3.

In the drawings I have shown a typical pie plate configuration it being understood that pies are made in all shapes and sizes. As shown, the pie plate is round and flat with an outwardly flared side having a rim and a peripheral bead. The prime feature of the pie plate is its flat bottom 10, in this instance a round disc-shaped bottom, and the side 11 extends upwardly and outwardly at 35° from said bottom. The rim 12 is horizontally disposed in spaced parallel relation to said bottom, and the bead 13 is, for example, a rolled edge. The beaded pie plate illustrated is of a moderate size 9 inches in diameter to the bead, and upstanding 1 inch high from the bottom to the rim. Further, this particular pie plate is of the expendable type, bring fabricated of thin aluminum sheet of 0.003 inch thickness. Therefore, rigidity of the pie plate structure is determined by its geometric shape, the aluminum being of a quality and with properties that make it soft and easily deformable.

This pie plate is appropriate for producing six sizable portions and is shown with lines of weakening X spaced to define a corresponding number of segmental sections S in the side 11. In accordance with this invention, the bottom 10 can and preferably remains intact and the lines of weakening X are confined to the side 11, and rim 12 and bead 13 when existent. In any case, the lines of weakening X extend radially in circumferential spaced relation, preferably equally spaced, emanating from the point of joinder between the bottom 10 and side 11 and running out at the periphery of the pie plate. Therefore, there is a series of six equally spaced lines of weakening X in the example shown, each in a vertical radially disposed plane extending through the side 11 and peripheral parts 12 and 13.

In FIGS. 1—4 the first embodiment involves lines of weakening X in the form of scoring 15 impressed into the metal body of the pie plate to make thin and embrittle the same. In this form the scoring 15 extends up the side 11 and outwardly of the rim 12 to run out at a notch 16 that removes a portion of the reinforcing bead 13. With this form of the invention, downward pressure applied by manipulation to the rim 12 intermediate and along the said rim between a pair of scorings 15 causes a separation of section S along the lines of weakening and with its consequent revolvement toward a third a flattened position. Said revolvement is affected by the remaining joinder of the section S to the bottom 10 as clearly shown in FIG. 2, said remaining joinder establishing a bendable hinge H as best illustrated in FIG. 4. The scoring 15 is shown in FIG. 3 as a V-shaped groove impressed substantially into the metal thickness thereby weakening the same.

In accordance with this invention, the above-described geometry of the preferred form of pie plate (round) is used to advantage to give added and unexpected results, namely a loosening of the pie portion from the underlying bottom of the pie plate, and further an exposure of an opening or interstice for the entry of a knife blade or spatula. As illustrated in FIGS. 2 and 4, the section S remains substantially intact in the area of its joinder to bottom 10, but not necessarily in the area of the rim 12 and bead 13. Therefore, the later area of the rim 12 and bead 13 is shown deformed into a flattened condition in FIG. 4 and which is more than likely to be the case when the section S is manipulated to expose a pie portion to best advantage. However, the segmental joinder of side 11 and bottom 10 remains arcuate (see FIG. 2) while the hinge H develops along a straight chord line extended between the lines of weakening that have permitted separation of the side 11 so as to free the section S for revolvement. As a consequence, the intact peripheral portion of bottom 10 or chord area acts as a lever that presses against the supporting surface and lifts the bottom 10 at hinge H. Since circumferential continuity of side 11 have been broken by a displacement of the section S, the pie plate as a whole is now easily deflected and this permits a bending of the now easily deflected and this permits a vending of the bottom 10 beneath and surrounding the pie portion to be extracted, and which induces said portion to depart from the bottom 10 and become loosened. Additionally, the turned down chord area separates from and becomes angularly disposed to the overlying pie portion, thereby facilitating entry of a knife blade or spatula into a pie portion supporting position. In practicing the lever action features of this invention, the lines of weakening X can be extended radially inward of the bottom a sufficient distance (not shown) thereby permitting a local lifting effect not affecting the next adjacent sections S.

In FIGS. 5 and 6 the second embodiment involves lines of weakening X' that are established by means of ripcords 21. In this form the ripcord 21 lies over the line at which the sections S' is to be separated, and is secured in said overlying position as by means of cementing the same in place. In accordance with this second form, the ripcord 21 emanates from the same point of joinder of the bottom 10 and side 11, and projects loosely beyond the rim and/or bead for manual engagement to be pulled downwardly. Again, the bead is interrupted by the notch 16, and thus the thin metal wall of the rim 12 and side 11 is easily ripped by a pulling of the ripcord, followed by manual depression of the side section as may be required to expose the portion of pie to be extracted.

In FIGS. 7 and 8 the third embodiment involves lines of weakening X" in the form of a tearstrip 30 that is established by means of a pair of parallel scoring 15", or by a pair of ripcords according to the second form (not shown). In this form there is a tab 31 projecting from the strip 30 formed between the scorings 15" and accessible at or within the notch 16. The required separation is established the S as in the second form. By pulling downwardly on the projecting part, and again followed by depressing the side section as required.

From the foregoing it will be seen that I have provided a very simple and practical addition to an otherwise commonly accepted pie plate. Wherein the various side sections S thereof can be separated and depressed as circumstances required in order to expose segmental portions of pie. Manual depression results in a revolvement that is advantageously employed in round pie plates to provide a lever action that loosens and opens an interstice for reception of a removal instrument. With the sections S flattened as shown in FIG. 4 it is a simple matter to enter a knife or a spatula between the bottom 10 and a piece or portion of pie, and to lift the same and extract if from the whole pie, all without prying or digging actions.

Having described only the typical preferred forms and applications of my invention, I do not wish to be limited or restricted to the specific details herein set forth, but wish to reserve to myself any modification or variations that may appear to those skilled in the art:

I claim:

1. A round pie plate facilitating the removal of cut portions of edible pie and including: a flat disc-shaped bottom and an upstanding outwardly flared side joined rigidly to the perimeter of the bottom and for the containment of the whole pie, and at least one pair of spaced lines of weakening emanating from the point of joinder between the bottom and side and extending upwardly and coextensively of the side, the pie plate being made of a bendable material and subject to deliberate separation along said lines of weakening upon manual depression of the side section therebetween and revolvement thereof on a hinge line extending between the said lines of weakening at said points of joinder, whereby the depressed side section exposes a portion of the pie.

2. The pie plate with a depressible side section as set forth in claim 1 and wherein the side has a rolled edge that is notched at each line of weakening to start separation of the side section from the remaining parts of the plate.

3. A round pie plate for loosening and facilitating the removal of cut portions of edible pie and including; a flat disc-shaped bottom and an upstanding side joined rigidly to the periphery of the bottom and for containment of the whole pie, and at least one pair of circumferentially spaced lines of weakening emanating from the point of joinder between the bottom and side and extending upwardly and coextensively of the side, the pie plate being made of a bendable material subject to deliberate separation along said lines of weakening upon manual depression of the side therebetween, there being a hinge extending on a chord line between the said lines of weakening at said points of joinder, whereby the depressed side section revolves and bends the chord area from the plane of the bottom and downwardly to act as a lever lifting up the area of the bottom radially inward of the same.

4. The pie plate with a depressible and revolvable side section as set forth in claim 3 and wherein the side has a rolled edge that is notched at each line of weakening to start separation of the side section from the remaining parts of the plate.